(12) United States Patent
Turner et al.

(10) Patent No.: US 10,752,218 B2
(45) Date of Patent: Aug. 25, 2020

(54) CAMERA WITH CLEANING SYSTEM

(71) Applicant: Ford Global Technologies, LLC, Dearborn, MI (US)

(72) Inventors: Taneshia Turner, Dearborn, MI (US); Venkatesh Krishnan, Canton, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 15/902,617

(22) Filed: Feb. 22, 2018

(65) Prior Publication Data
US 2019/0256054 A1    Aug. 22, 2019

(51) Int. Cl.
| | |
|---|---|
| *B60S 1/56* | (2006.01) |
| *B60R 11/04* | (2006.01) |
| *G06T 7/00* | (2017.01) |
| *G01N 21/15* | (2006.01) |
| *G02B 27/00* | (2006.01) |
| *G05D 1/02* | (2020.01) |
| *B60R 1/12* | (2006.01) |
| *B60R 11/00* | (2006.01) |

(52) U.S. Cl.
CPC .............. *B60S 1/56* (2013.01); *B60R 11/04* (2013.01); *G01N 21/15* (2013.01); *G02B 27/0006* (2013.01); *G05D 1/0246* (2013.01); *G05D 1/0257* (2013.01); *G06T 7/0002* (2013.01); *B60R 2001/1253* (2013.01); *B60R 2011/004* (2013.01); *G01N 2021/157* (2013.01); *G06T 2207/30252* (2013.01)

(58) Field of Classification Search
CPC ... B60S 1/56; B60R 11/04; B60R 2001/1253; G01N 21/15; G02B 27/0006; G05D 1/0246; G05D 1/0257; G05D 1/0088; G05D 1/0214; G05D 1/0276; G06T 7/0002; G06T 2207/30261; G06T 2207/10028; G06T 2207/30252; B60W 30/09; B60W 30/0956; B60W 30/095; B60W 30/0953; B60W 2420/42; B60W 2420/52; G06K 9/00805; G06K 9/00791; G06K 9/00798; G06K 9/00825; G06K 9/00369; G08G 1/16; G08G 1/161–1/168; G01S 13/867; G01S 13/931; G01S 13/865; G01S 13/87; G01S 13/86; G01S 13/89; B60T 2201/022
See application file for complete search history.

(56) References Cited

U.S. PATENT DOCUMENTS

| | | | |
|---|---|---|---|
| 9,070,293 B2 * | 6/2015 | Roeber | G08G 1/0967 |
| 9,120,484 B1 * | 9/2015 | Ferguson | G05D 1/0214 |
| 9,126,534 B2 | 9/2015 | Snider | |
| 9,535,423 B1 * | 1/2017 | Debreczeni | G05D 1/0088 |
| 9,555,781 B2 * | 1/2017 | Breuer | B60T 7/22 |
| 9,619,718 B2 | 4/2017 | Michmerhuizen et al. | |
| 9,669,827 B1 * | 6/2017 | Ferguson | B60W 30/09 |

(Continued)

*Primary Examiner* — Michael S Osinski
(74) *Attorney, Agent, or Firm* — Frank A. MacKenzie; Bejin Bieneman PLC

(57) ABSTRACT

A computer in a vehicle includes a processor is programmed to detect an object proximate to the vehicle. The processor is further programmed to activate at least one of a plurality of cameras from a deactivated state and operate the vehicle according to an object type determined with data from the at least one of the cameras.

18 Claims, 9 Drawing Sheets

(56) References Cited

U.S. PATENT DOCUMENTS

| | | | |
|---|---|---|---|
| 9,707,896 B2 | 7/2017 | Boegel et al. | |
| 9,937,905 B2* | 4/2018 | Kim | B60T 7/22 |
| 9,981,639 B2* | 5/2018 | Ohbayashi | B60T 7/22 |
| 9,981,658 B2* | 5/2018 | Ichikawa | B60W 30/09 |
| 10,046,761 B2* | 8/2018 | Meyer | B60W 30/09 |
| 10,089,419 B2* | 10/2018 | Michalke | G06F 17/5009 |
| 10,421,436 B2* | 9/2019 | Gage | B60R 25/305 |
| 10,421,453 B1* | 9/2019 | Ferguson | B60W 30/09 |
| 10,672,275 B2* | 6/2020 | Minemura | B60K 31/0008 |
| 2009/0182505 A1* | 7/2009 | Ikeda | G01S 13/931 701/301 |
| 2012/0106786 A1* | 5/2012 | Shiraishi | G01S 17/936 382/103 |
| 2012/0117745 A1 | 5/2012 | Hattori et al. | |
| 2012/0170808 A1* | 7/2012 | Ogata | G01S 17/936 382/103 |
| 2012/0286974 A1* | 11/2012 | Claussen | G08G 1/162 340/935 |
| 2012/0330528 A1* | 12/2012 | Schwindt | G01S 13/52 701/96 |
| 2015/0210274 A1* | 7/2015 | Clarke | B60K 31/00 382/104 |
| 2015/0348417 A1* | 12/2015 | Ignaczak | G08G 1/165 340/435 |
| 2017/0009616 A1 | 1/2017 | Shishido et al. | |
| 2017/0103271 A1* | 4/2017 | Kawagoe | G06K 9/00805 |
| 2017/0186319 A1* | 6/2017 | Tsushima | B60W 30/0956 |
| 2017/0248953 A1* | 8/2017 | Kelley | B62D 15/0265 |
| 2017/0259728 A1* | 9/2017 | Nagata | B60Q 9/006 |
| 2017/0313288 A1 | 11/2017 | Tippy et al. | |
| 2017/0320473 A1* | 11/2017 | Ohbayashi | B60T 7/22 |
| 2018/0009418 A1* | 1/2018 | Newman | G01S 7/497 |
| 2018/0143298 A1* | 5/2018 | Newman | B60W 50/0098 |
| 2018/0272992 A1* | 9/2018 | Gage | G06K 9/00771 |
| 2018/0284789 A1* | 10/2018 | Oguro | G05D 1/0088 |
| 2019/0004150 A1* | 1/2019 | Mano | G01S 17/89 |
| 2019/0034742 A1* | 1/2019 | Gokan | G01S 13/867 |
| 2019/0080182 A1* | 3/2019 | Oe | G06K 9/00805 |
| 2019/0092340 A1* | 3/2019 | Chundrlik, Jr. | B60W 50/0205 |
| 2019/0113926 A1* | 4/2019 | Sim | H04W 4/40 |
| 2019/0163202 A1* | 5/2019 | Hatano | B60W 30/00 |
| 2019/0174029 A1* | 6/2019 | Mandai | H04N 5/2171 |
| 2019/0196481 A1* | 6/2019 | Tay | B60W 30/00 |
| 2019/0250622 A1* | 8/2019 | Nister | B60R 1/00 |
| 2019/0256090 A1* | 8/2019 | Yoo | B60W 30/18163 |
| 2019/0354778 A1* | 11/2019 | Ermilios | G06K 9/6202 |
| 2019/0359215 A1* | 11/2019 | Shimakage | B60K 31/00 |
| 2019/0375378 A1* | 12/2019 | Nezu | B08B 5/02 |
| 2019/0375412 A1* | 12/2019 | Ishioka | B60W 30/14 |
| 2020/0027333 A1* | 1/2020 | Xu | G08B 25/007 |
| 2020/0053295 A1* | 2/2020 | Asai | B60R 1/00 |
| 2020/0086791 A1* | 3/2020 | Hardy | G06T 3/4038 |
| 2020/0183411 A1* | 6/2020 | Oba | B60W 30/12 |

* cited by examiner

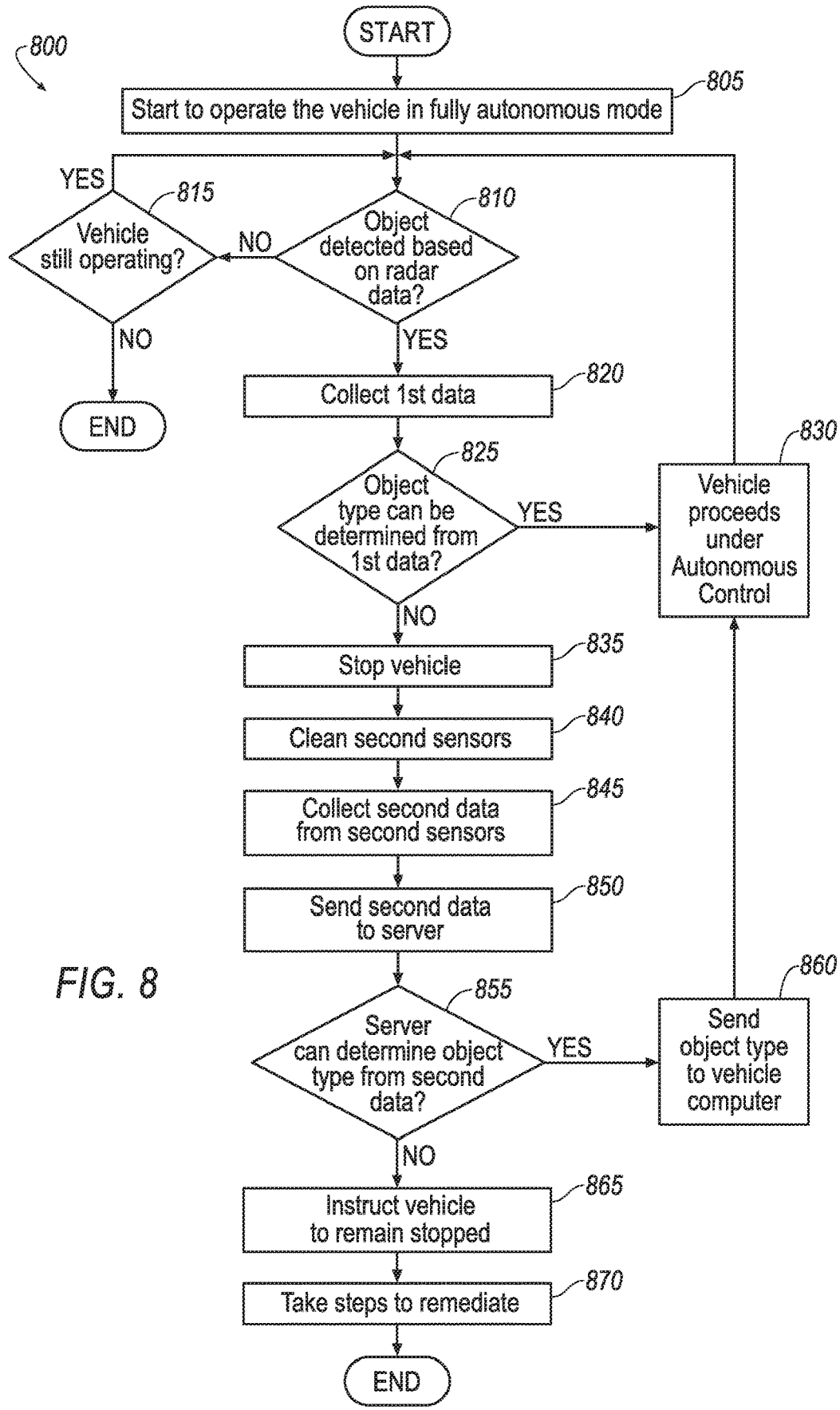

CAMERA WITH CLEANING SYSTEM

BACKGROUND

Autonomous vehicles utilize a plurality of sensors to detect and determine the types of objects along a travel path, including radar, cameras and lidar. In some cases, the computer controlling the vehicle may detect an object based on radar data. However, radar typically does not support detection of an object type. Further, it is a problem that the computer controlling the vehicle may not be able to determine the object type based on data from other sensors such as sensors that continuously and/or periodically provide data for vehicle control, e.g., image data from cameras and lidars.

BRIEF DESCRIPTION OF THE DRAWINGS

FIG. 8 is a diagram of an example process for supplementing first data from first sensors with second data from second cameras.

DETAILED DESCRIPTION

Figure 1:
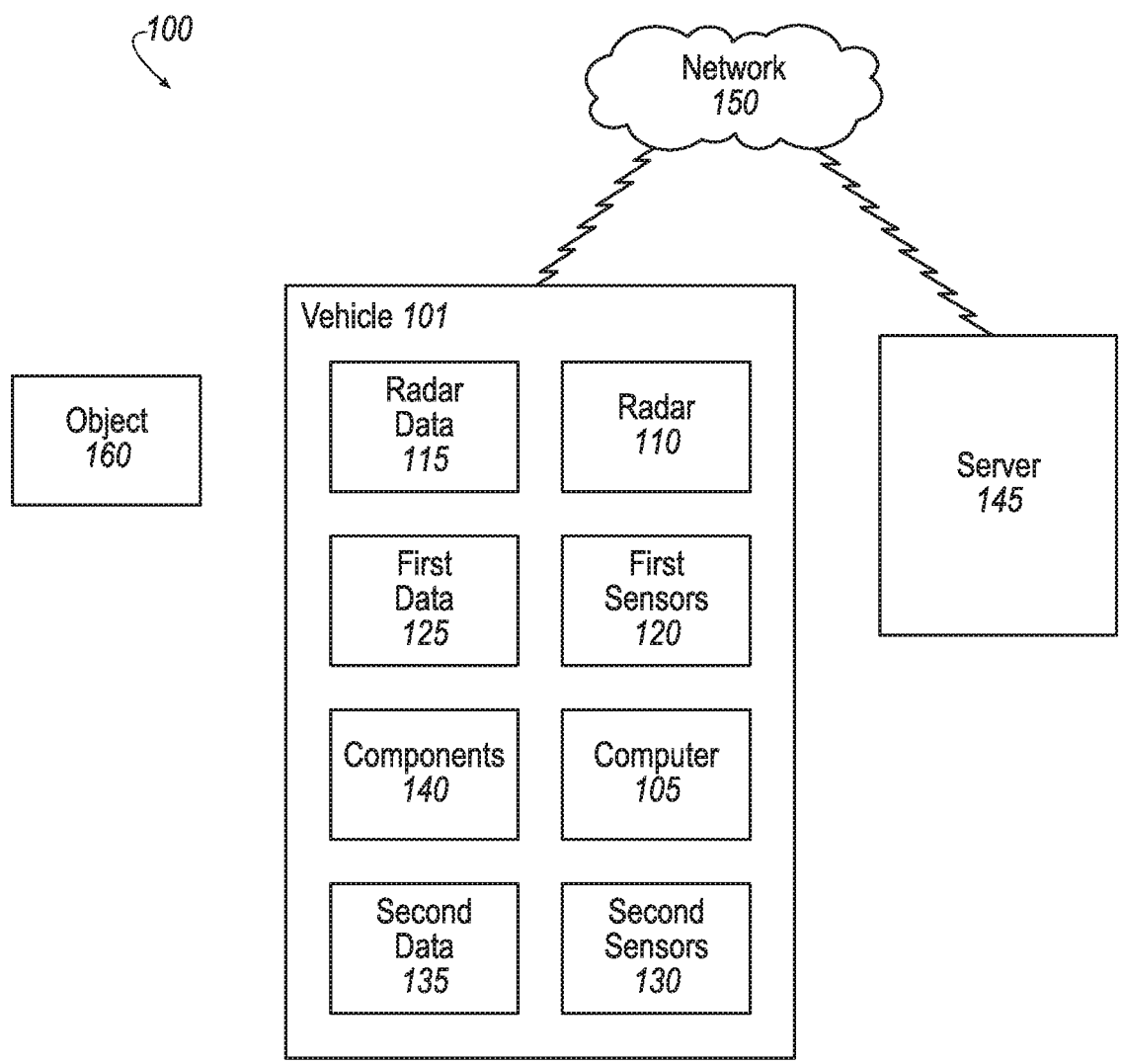
FIG. 1 is a block diagram of an example system for identifying an object proximate to a vehicle.

A computer in a vehicle includes a processor and a memory, the memory storing instructions executable by the processor such that the processor is programmed to detect an object proximate to the vehicle. The instructions can further include instructions to activate at least one of a plurality of cameras from a deactivated state and operate the vehicle according to an object type determined with data from the at least one of the plurality of cameras.

The instructions can further include instructions to determine that the processor cannot determine the object type based on sensors operating at a time of detecting the object.

The instructions can further include instructions to stop the vehicle based on determining that the processor cannot determine the object type.

The instructions can further include instructions to request a server to determine the object type based on the data from the at least one of the plurality of cameras, receive a message from the server indicating that the server cannot determine the object type; and maintain the vehicle in a stopped condition.

The sensors can have a first field of vision and the plurality of cameras can have a second field of vision that includes an area between the first field of vision and the vehicle.

The cameras can be located below a roofline of the vehicle.

One of the cameras can be located at one of a side-view mirror of the vehicle, a front grill area of the vehicle, and a rear license plate area of the vehicle.

The instructions can further include instructions to request a server to determine the object type based on the data from the at least one of the plurality of cameras; and receive the object type from the server.

The instructions can further include instructions to clean one or more of the plurality of cameras.

The instruction to detect the object proximate to the vehicle can include instructions to determine that the object is within a predetermined distance of a path of the vehicle.

A system includes a plurality of cameras mountable to a vehicle, and a computer including a processor and a memory, the memory storing instructions executable by the processor to detect an object proximate to the vehicle, activate at least one of the plurality of cameras from a deactivated state and operate the vehicle according to the object type determined with data from the at least one of the plurality of cameras.

The system can further include sensors, and the instructions can further include instructions to determine the object type based on data from the sensors.

The instructions can further include instructions to stop the vehicle based on determining that the processor cannot determine the object type.

The system can further include a server programmed to receive a request from the processor to determine the object type based on the camera data, determine the object type; and send the object type to the processor.

The sensors can have a first field of vision and the plurality of cameras can have a second field of vision that includes an area between the first field of vision and the vehicle.

One of the plurality of cameras can be mountable to one of a side-view mirror of the vehicle, a front grill area of the vehicle, and a rear license plate area of the vehicle.

The system can further include cleaning means, and the instructions can include instructions to activate the cleaning means to clean at least one of the cameras.

A system can include image capturing means and processing means programmed to detect an object proximate to a vehicle, activate the image capturing means from a deactivated state, and operate the vehicle according to an object type determined with data from the image capturing means.

The system can further include sensors, and the instructions can further include instructions to determine that the processing means cannot determine the object type based on the sensors, stop the vehicle based on determining that the processing means cannot determine the object type, and activate cleaning means to clean the image capturing means.

The instructions can further include instructions to request a server to determine the object type based on data from the image capturing means, receive a message from the server indicating that the server cannot determine the object type; and maintain the vehicle in a stopped condition.

FIG. 1 illustrates an example system 100 for operating a vehicle 101. The vehicle 101 includes a computer 105 programmed to operate the vehicle 101. The computer 105 includes one or more processors and a memory. The memory stores instructions executable by the one or more processors. As discussed below, the computer 105 is programmed to detect an object 160 proximate to the vehicle 101 based on radar data 115 collected by radar 110. The computer 105 is further programmed to determine a type of an object 160 (i.e., an "object type") proximate to the vehicle 101 based on first data 125 from first sensors 120. An object type is a classification of the object based on physical characteristics such size, shape, color, types of motion, etc. In the case that the computer 105 cannot determine the object type based on the first data 125, the computer 105 is programmed to clean and activate second cameras 130, collect second data 135 and send the second data 135 to a server 145. The computer 105 "cannot determine the object type" means that the computer 105 failed to determine the object type after execution of programming for object type determination. The server 145 then determines, or attempts to determine, the type of the object 160 based on the second data 135. In some cases, the server 145 may additionally receive and utilize the first data 125 to determine or attempt to determine the type of the object 160.

When the computer 105 operates the vehicle 101, the vehicle 101 is an "autonomous" vehicle 101. The computer 105 includes computer code (software), and may further include firmware, and dedicated hardware for controlling the vehicle 101.

For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

During autonomous operation of the vehicle 101, the computer 105 is programmed to collect radar data 115 from the radar 110 and first data 125 from first sensors 120. The radar 110 is typically active during the fully autonomous mode. The first sensors 120 include lidar and cameras that are also typically active during the fully autonomous mode. Active means that the radar 110 and the first sensors 120, etc., are under power, activated, and providing respectively radar data 115 and first data 125 to the computer 105 at least one time per minute. Typically, the radar 110 and first sensors 120 provide respectively radar data 115 and first data 125 to the computer 105 multiple times per second. The radar data 115 includes data regarding a respective location for objects 160 in the path of the vehicle 101. The first data 125 includes data regarding the environment in which the vehicle 101 is operating, including image data related to objects 160 proximate to the vehicle 101. Objects 160 include inanimate objects of any type such as road signs, cars, and debris and further includes animate objects of any type such as people and animals.

Based on the first data 125, the computer 105 is programmed to determine, or attempt to determine, a type of the object 160, using image recognition techniques, as are known. The type of an object 160, as used herein, is a recognizable category of animate objects or inanimate objects such as a rock, a plastic bag, a newspaper, a truck, a person, a dog, etc. For example, the computer 105 may maintain a table of types of object types. Using known image recognition techniques, the computer 105 may determine that the object 160 matches one of the types of objects in the table.

In some cases, the computer 105 may not be able to determine the type of the object 160 based on the first data 125 from the first sensors 120. For example, as described in additional detail below, the object 160 may be detected by the radar 110, but may not be in the field of vision of any of the first sensors 120. In this case, the first data 125 does not include the object 160, and the computer 105 cannot determine the type of the object 160. In other cases, the first data 125 may not be sufficiently clear, or may only include a portion of the object 160, such that the computer 105 cannot determine the type of the object 160.

In these cases, where the computer 105 cannot determine an object type, the computer 105 is programmed to stop the vehicle 101. The computer 105 is further programmed to activate second cameras 130. Second cameras 130 collect second data 135 that is used to determine the type of the object 160 proximate to the vehicle 101 when the type of the object 160 cannot be determined based on first data 125. Second cameras 130 include cameras and/or lidar located on the vehicle 101 to collect second data 135 that is not within the field of vision of the first sensors 120. The computer 105 is further programmed to send the second data 135 to the server 145 for evaluation. The computer 105 is further programmed to receive data and instructions from the server 145. Based on the data and instructions from the server 145, the computer 105 may determine whether to restart operation of the vehicle 101, or discontinue operation of the vehicle 101 (i.e., keep the vehicle 101 in a stopped condition).

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including first sensors 120. Additionally or alternatively, in cases where the computer 105 actually comprise multiple devices, the vehicle network may be used for communications between devices represented as the computer 105 in this disclosure. In addition, the computer 105 may be programmed for communicating with a network which may include various wired and/or wireless networking technologies, e.g., cellular, Bluetooth®, Bluetooth® Low Energy (BLE), wired and/or wireless packet networks, etc.

The vehicle 101 includes a plurality of vehicle components 140. Each vehicle component 140 includes one or more hardware components adapted to perform a mechanical function or operation—such as moving the vehicle, slowing or stopping the vehicle 101, steering the vehicle 101, etc. Non-limiting examples of vehicle components 140 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. As used herein, "the computer 105 operating the vehicle 101" means that the computer 105 is sending instructions, in a vehicle network or bus, to the vehicle components 140 to perform vehicle operations such as guiding the vehicle 101 along a path, parking the vehicle 101, stopping the vehicle 101, etc.

First sensors 120 include first cameras and first lidar that are typically active during the fully autonomous mode of the vehicle 101 and provide first data 125 to the computer 105. As noted above, "active" during the fully autonomous mode means that they are under power, activated, and providing respective data to the computer 105 at least one time per minute. The first data 125 may include representations of objects 160 proximate to the vehicle 101, roads, and other features of the environment in which the vehicle 101 is travelling. In general, the first data 125 may include any data that may be gathered by the first sensors 120 and may further include data computed from such data.

Second cameras 130 are typically in a deactivated state during autonomous operation of the vehicle 101. The second cameras being in a deactivated state means that second cameras 130 are not providing the second data 135 to the computer 105 at least one time per minute and/or that the computer 105 is not utilizing the second data 135 to control the vehicle 101.

Typically, the second cameras 130 are cameras located on the vehicle 101 and positioned below a roofline of the vehicle 101 to have a field of vision to include areas proximate to the vehicle 101 that are not included in the field of vision of the first sensors 120. For example, the vehicle 101 may include four second cameras 130, one located at a front end of the vehicle 101, one at a rear end of the vehicle 101, and one mounted respectively on each of the left and right side-view mirrors.

Second data 135 is image data captured by the second cameras 130 and provided to the computer 105. The computer 105 collects the second data 135 and transmits the second data 135 to the server 145 for evaluation.

The server 145 is a computer programmed to receive and evaluate the second data 135, using image recognition techniques as are known. Evaluating the second data 135, as used herein means to determine whether the second data 135 is sufficient to determine the type of an object 160 represented by the data, and in the case that the data is sufficient, determine the type of the object 160. The data is "sufficient to determine the type of an object 160 represented by the data" as used herein, means that "the server 145 was able to determine the type of the object 160 based on the second data 135 using programming implementing the image recognition techniques." "Determining the type of the object" means determining that the second data 135 matches a stored object type. For example, the server 145 may maintain a table of known object types, and using image recognition techniques, compare the second data 135 to the objects in the table of known object types. In a case that a match is found, the server 145 determined the type of the object 160. The server 145 is further programmed, based on the results of the evaluation, to send a message to the computer 105 indicating whether the type of the object 160 could be determined, the type of the object 160, and/or instructions for operating the vehicle 101 based on the second data 135.

The network 150 is one or more mechanisms by which the vehicle 101 and the server 145 communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth®, IEEE 802.11, etc.), local area networks (LAN) and/or wide area networks (WAN), including the Internet, providing data communication services.

The types of wireless communications may include one or more of cellular, Bluetooth®, IEEE 802.11 (typically, Wi-Fi®), dedicated short range communications (DSRC), two-way satellite (e.g., emergency services), one-way satellite (e.g., receiving digital audio radio broadcasts), AM/FM radio, etc.

Figure 2:
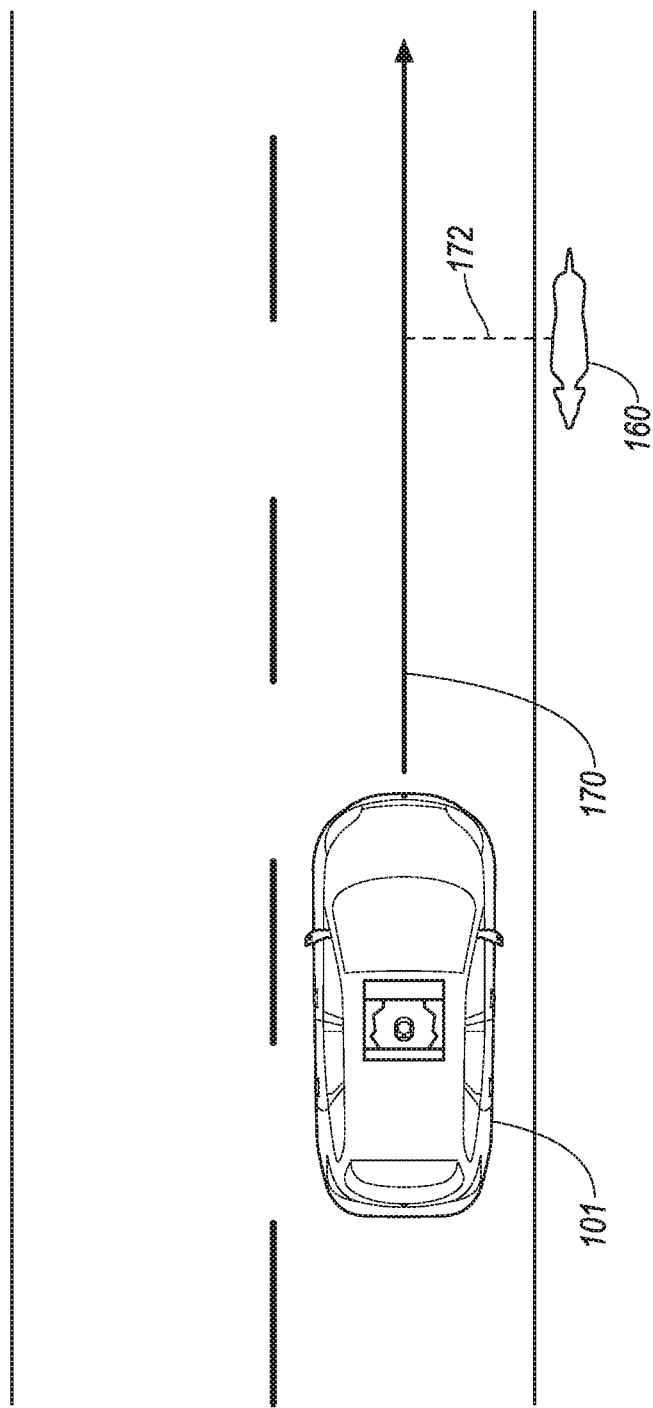
FIG. 2 illustrates an example vehicle and vehicle travel path with an object proximate to the vehicle.

FIG. 2 illustrates an exemplary vehicle 101 travelling along a travel path 170. An object 160 along the travel path may be proximate to the vehicle 101. For example, a specified area proximate to the vehicle 101 can mean an area within a predetermined distance of the vehicle 101 (e.g., radius from a point in the vehicle 101) and/or within a predetermined distance of the travel path 170 of the vehicle 101. The predetermined distance to the travel path 170 can be measured along a shortest straight-line path 172. The shortest straight-line path 172 is a path between the travel path 170 and the object 160 that is perpendicular to the travel path 170.

The predetermined distance may be a specified distance, such as 10 meters. Additionally or alternatively, the predetermined distance may depend on the direction of the object 160 from the vehicle 101, etc. For example, the specified distance may be within two meters of the vehicle 101 on either side of the vehicle 101 and/or within 10 meters of the travel path of the vehicle 101. Additionally, for example when the vehicle 101 is travelling forward, the computer 105 may determine that objects 160 behind the vehicle 101 are not proximate to the vehicle 101, even though they are within the specified distance.

As another example, an area proximate to the vehicle 101 can be partially specified based on the field of vision of the first sensors 120. For example, "proximate to the vehicle" may defined as a combination of the field of vision of the first sensors 120 (see FIGS. 5A, 5B, 6 and 7), within a predetermined distance from the vehicle 101 and within a predetermined distance from the path of the vehicle 101.

The travel path 170 of the vehicle 101 as used herein is a path along which the computer 105 intends to guide the vehicle 101. The computer 105 may determine the travel path 170, e.g., based on a current location of the vehicle 101 and a destination of the vehicle 101.

Figure 3:
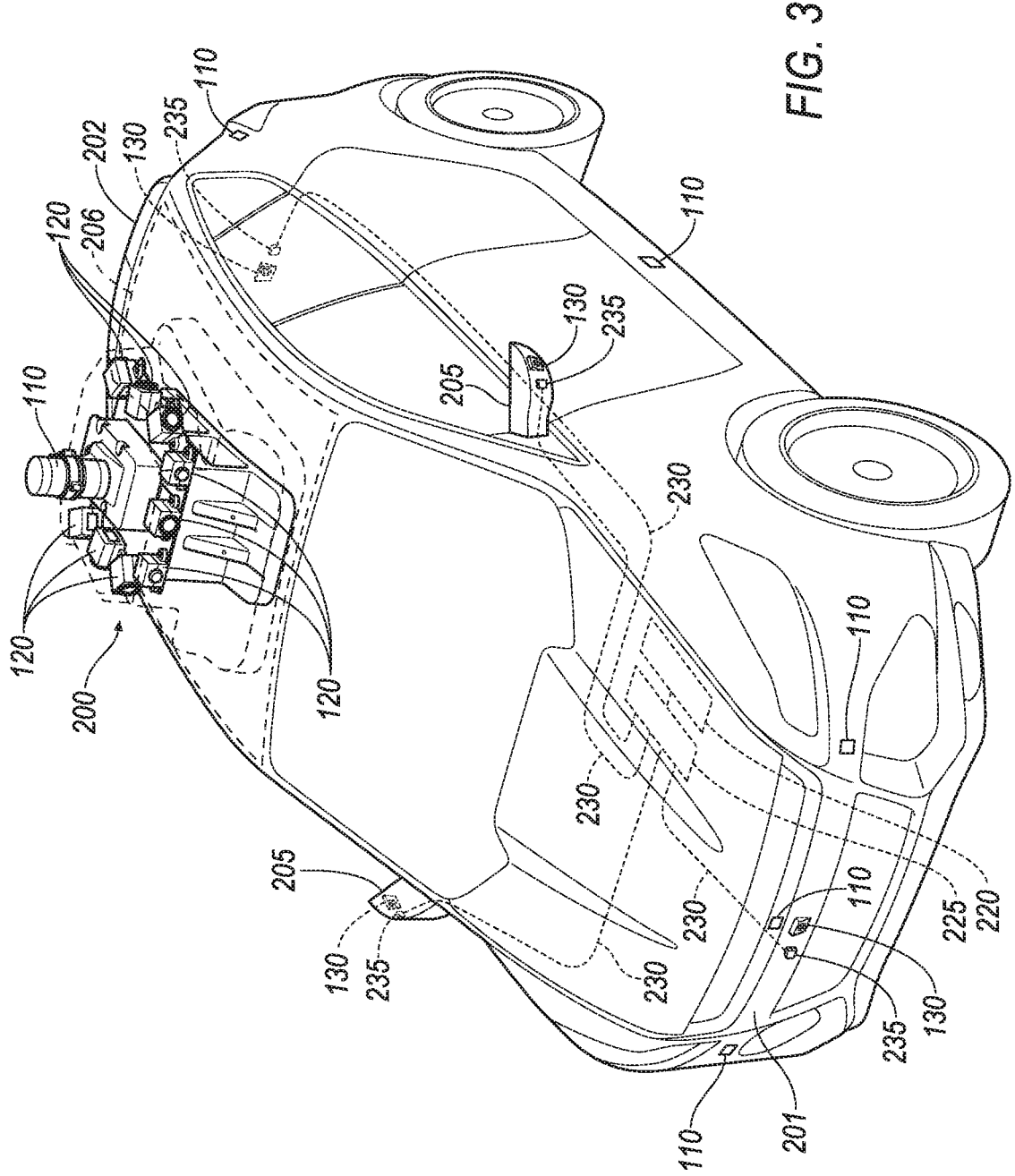
FIG. 3 is an isometric view of the vehicle including first sensors and second cameras.

FIG. 3 illustrates an example vehicle 101. The vehicle 101 includes a plurality of radars 110. The vehicle 101 can include a sensor assembly 200 on a top of the vehicle 101. The sensor assembly 200 can include a plurality of first sensors 120. In some cases, the sensor assembly 200 can further include one or more radars 110.

The vehicle 101 further includes one or more second cameras 130. In one example, the vehicle 101 can include four second cameras 130. The four second cameras 130 can be located below the roofline 206 of the vehicle 101 respectively at the front end 201 of the vehicle 101, at a rear end 202 of the vehicle 101, and on each of the left and right side-view mirrors 205. The roofline 206 is a level where a body of the vehicle 101 transitions from the top of the vehicle 101 to the sides, front or rear of the vehicle 101.

For example, as shown in FIG. 3, one of the second cameras 130 can be located in a grill area on the front end 201 of the vehicle 101 and a second camera 130 can be located in a license plate area on the rear end 202 of the vehicle 101. Two additional second cameras can be located respectively on the left and right side-view mirrors 205. As described in additional detail below, the second cameras 130 may be positioned to have a field of vision in an area proximate to the vehicle 101 that is at least partially not included in the field of vision of the first sensors 120.

The vehicle 101 can include cleaning means which can include a fluid reservoir 220, a pump 225, fluid lines 230 and nozzles 235. The fluid reservoir 220 can contain washer fluid to spray onto the second cameras 130. The fluid reservoir 220 can be in fluid communication with a pump 225 via the fluid line 230. The pump 225 can direct the washer fluid from the fluid reservoir 220 through fluid lines 230 and further through nozzles 235 to spray the washer fluid onto, e.g., the second cameras 130.

Figure 4:
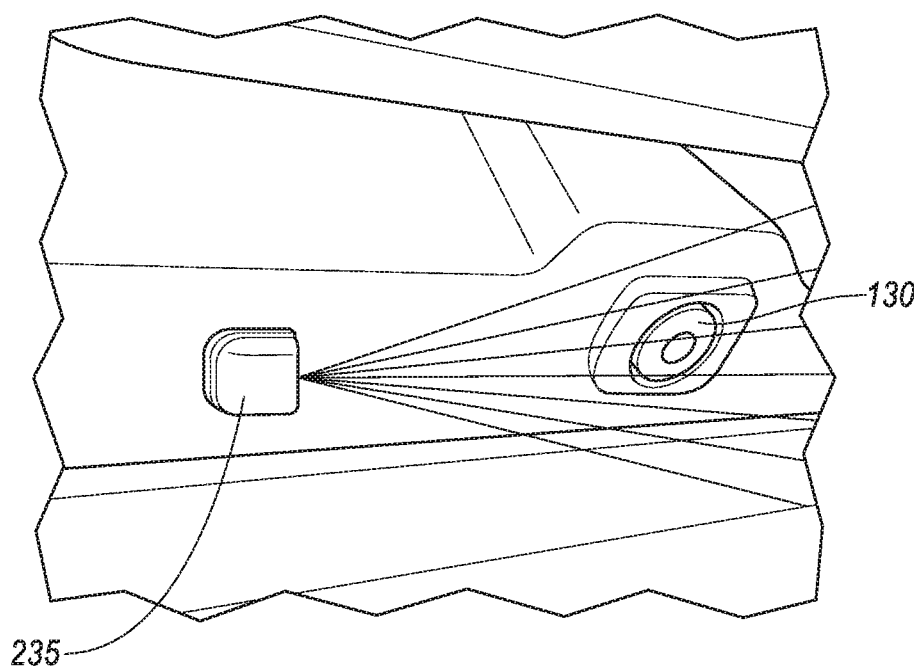
FIG. 4 illustrates an example nozzle arranged next to a second camera.

FIG. 4 illustrates a nozzle 235 arranged next to a second camera 130. The nozzle 235 is arranged to distribute washer fluid on a lens or cover of the second camera 130 to clean the cover or lens. As described above, the vehicle 101 may include a nozzle 235 arranged respectively next to one or more of the second cameras 130. The computer 105 may be programmed to clean the one or more second cameras 130 prior to activating them to collect second data 135 by activating the pump 225 to pump washer fluid through the respective nozzles 235.

Figure 5A:
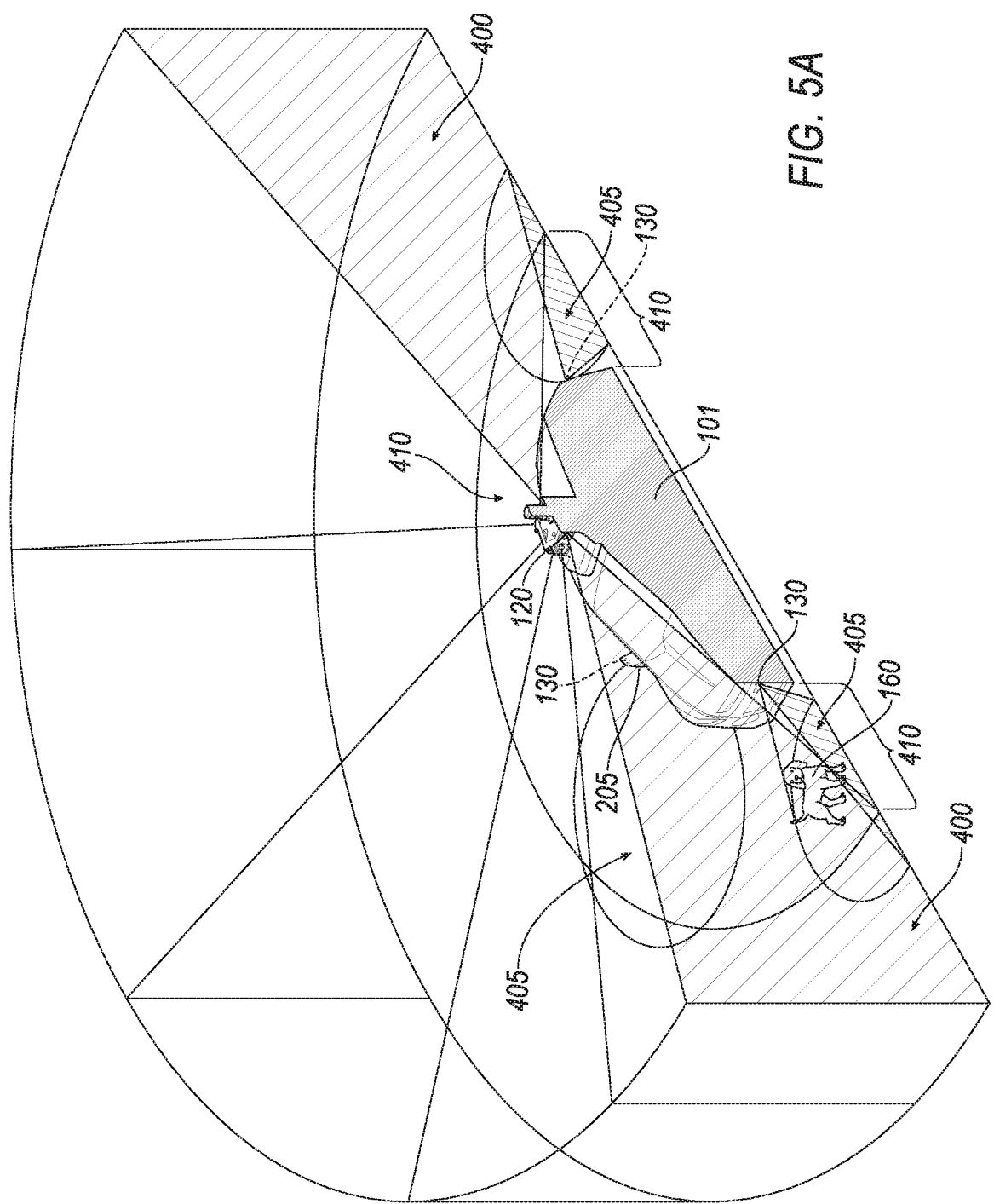
FIGS. 5A and 5B are cut-away perspective views of an example vehicle illustrating fields of view for first sensors and second cameras.
Figure 5B:
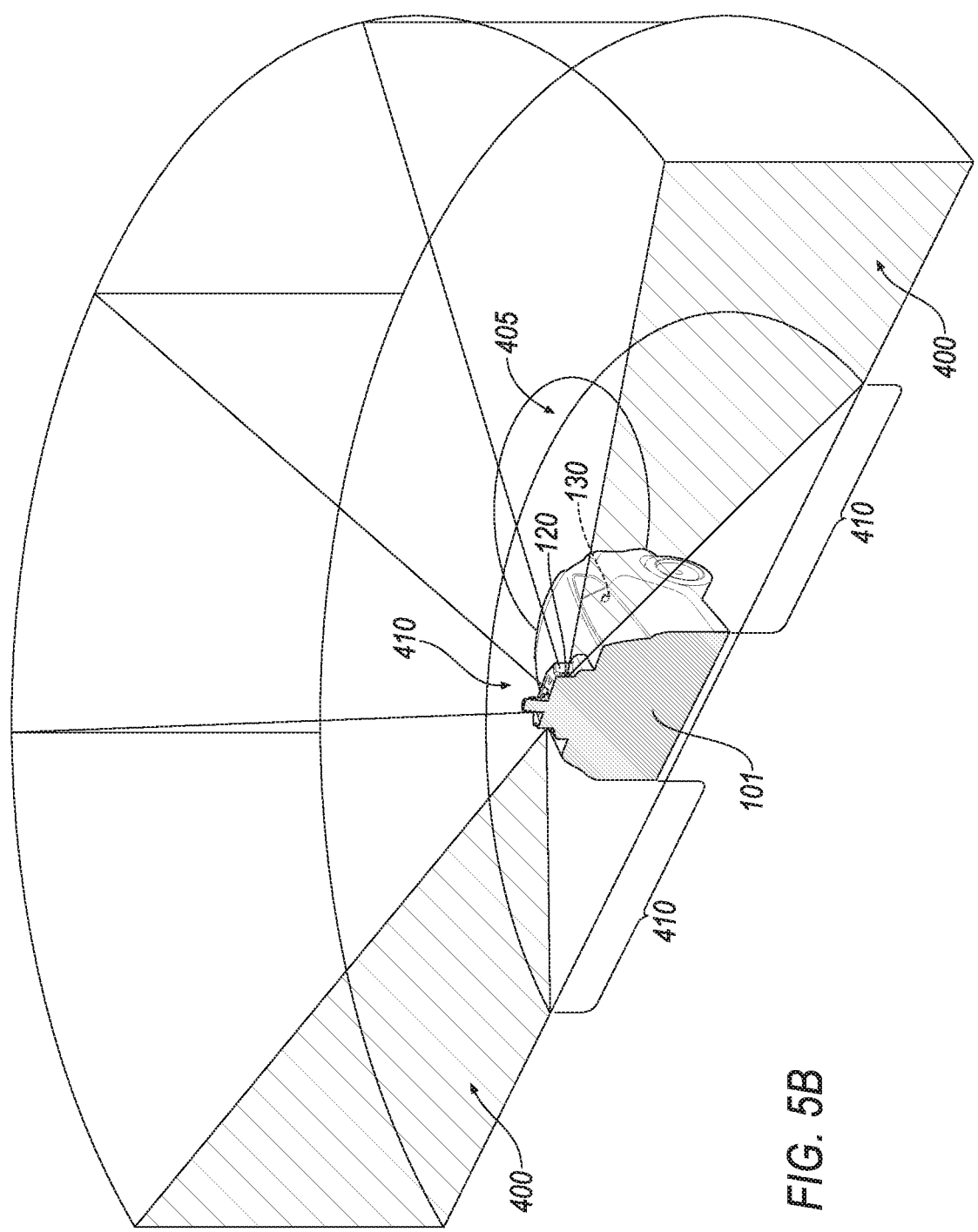

FIGS. 5A and 5B are cut-away, perspective views of an example vehicle 101 including an example field of vision 400 for first sensors 120 and an example field of vision 405 for the second cameras 130. The field of vision 400 for the first sensors 120 includes the field of vision 400 of each of the first sensors 120. The field of vision 405 for the second cameras 130 includes all of the fields of vision 405 of the second cameras 130.

The field of vision 400 for the first sensors 120 extends away from the vehicle 101 in directions surrounding the vehicle 101 and further expands in a "V" shape upward and downward, the "V" shape originating at the first sensors 120. The field of vision 400 for the first sensors 120 includes an area on the ground surrounding the vehicle 101. However, due to interference from a contour of the vehicle 101, the field of vision 400 does not include a blind spot 410. The blind spot 410 is an area on the ground, adjacent to and surrounding the vehicle 101, that is not in a line-of-sight of the first sensors 120. The field of vision 400 may extend away from the vehicle 101 as far as the first sensors 120 can still receive image data based on their sensitivity.

In some cases, the object 160 may be located in the blind spot 410. In this case, the radar 110 of the vehicle 101 may detect the object 160. However, the computer 105 will not receive first data 125 from the first sensors 120 with which to determine the type of the object 160. In this case, the computer 105 is programmed to stop the vehicle 101 and activate second cameras 130 to attempt to determine the type of the object 160.

As described above, the second cameras 130 may be located on the front end 201 and rear end 202 of the vehicle 101, and on the left and right side-view mirrors 205. They may be directed such that the field of vision 405 of the second cameras 130 includes portions or all the blind spot 410 that is not in the line-of-sight of the first sensors 120. The second cameras 130, can collect image data from the blind spot 410 and provide second data 135 to the computer 105.

Figure 6:
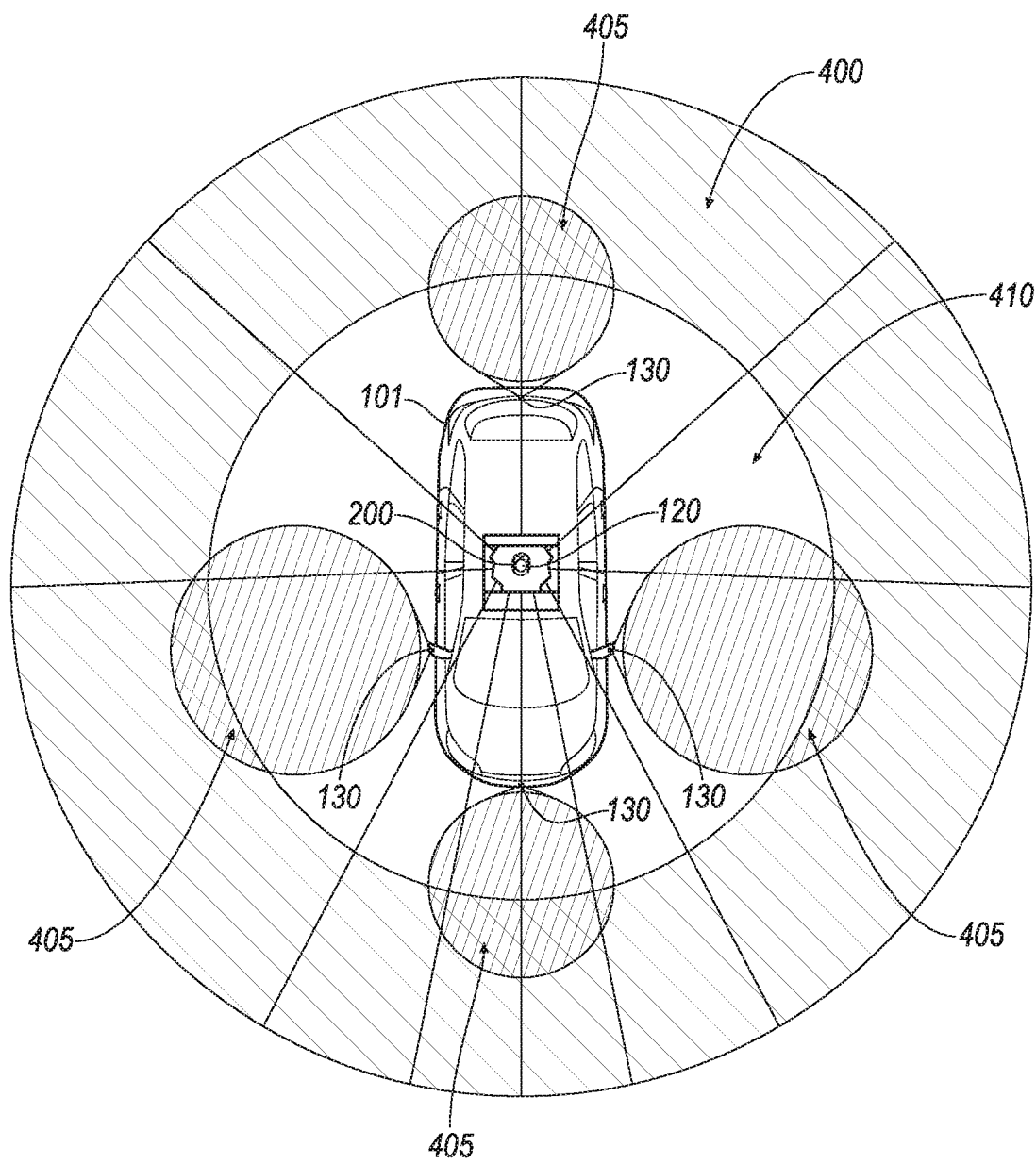
FIG. 6 is a top view of the vehicle of FIGS. 5A and 5B illustrating the fields of vision for first and second cameras.

FIG. 6 is a top view of the example vehicle 101 of FIGS. 5A and 5B showing the field of vision 400 at ground level and the blind spot 410 adjacent to the vehicle 101 where there is no line-of-sight from the first sensors 120. FIG. 6 also shows that the second field of vision 405 includes a portion of the blind spot 410.

Figure 7:
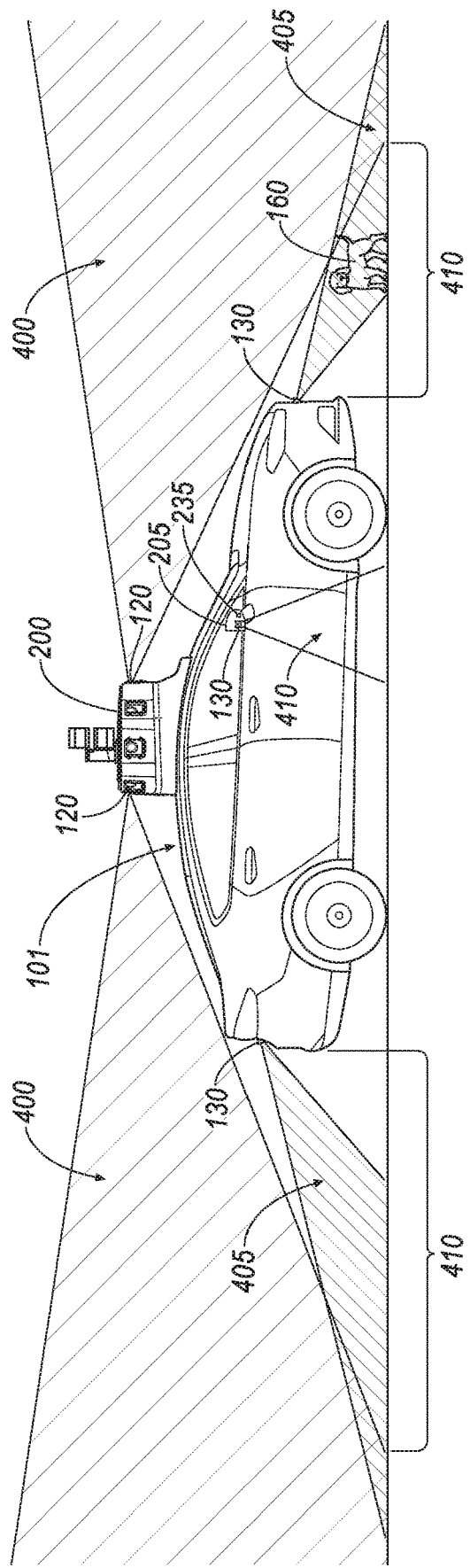
FIG. 7 is a side view of the vehicle of FIGS. 5A, 5B and 6 illustrating fields of vision for first sensors and second cameras.

FIG. 7 is a side view of the example vehicle 101 of FIGS. 5A, 5B and 6, and illustrates the field of vision 400 respectively for the first sensors 120 and the blind spot 410. FIG. 7 also illustrates the field of vision 405 for the second cameras 130. As described above, the field of vision 400 extends away from the vehicle 101, and does not include the blind spot 410 between the field of vision 400 and the vehicle 101. The second field of vision 405 extends away from the vehicle 101 and down toward the ground, such that the second field of vision 405 includes at least a portion of the blind spot 410. In this manner, the second cameras 130 may collect second data 135 representing objects 160 within the blind spots 410 of the first sensors 120.

FIG. 8 illustrates an example process 800 for determining a type of an object 160 proximate to the vehicle 101. The process 800 begins in a block 805.

In the block 805, the computer 105 starts to operate the vehicle 101 in a fully autonomous mode. For example, the computer 105 may begin to operate the vehicle 101 in the fully autonomous mode in response to an instruction from a user of the vehicle 101, or from the server 145. When the computer 105 starts to operate the vehicle 101 in the fully autonomous mode, the process 800 continues in a block 810.

In the block 810, the computer 105 determines whether there is an object 160 proximate to the vehicle 101 based on radar data 115. The computer 105 receives and evaluates radar data 115 from the radars 110. Based on the evaluation, the computer 105 determines whether the radar data 115 indicates an object 160 proximate to the vehicle 101. In the case that the computer 105 determines that the radar data 115 does not indicate an object 160 proximate to the vehicle 101, the process 800 continues in a block 815. In the case that computer 105 determines that the radar data 115 does indicate the object 160 proximate to the vehicle 101, the process 800 continues in a block 820.

In the block 815, the computer 105 determines whether the vehicle 101 is still operating in the fully autonomous mode. In the case that the computer 105 has received an instruction to turn off the vehicle 101, or disable autonomous operation, the process 800 ends. Otherwise, the process 800 continues in the block 810.

In the block 820, the computer 105 collects first data 125 from the first sensors 120. As described above, the first sensors 120 are operating substantially continuously when the vehicle 101 is operating in the fully autonomous mode. One or more of the first sensors 120 are providing data to the computer 105 at least once per minute.

Next, in a block 825, the computer 105 determines whether it can determine the type of the object 160 based on collected first data 125. In the case that the computer 105 can determine the type of the object 160, it does so. The process 800 continues in a block 830. In the case that the computer 105 cannot determine the type of the object 160, the process 800 continues in a block 835.

In the block 830, the computer 105 resumes operation of the vehicle 101 in the fully autonomous mode. The computer 105 utilizes the type of the object 160 to control the vehicle 101. The process 800 continues in the block 810.

In the block 835, which follows the block 825, the computer 105 stops the vehicle 101. That is, the computer 105 sends instructions to the vehicle components 140 to stop movement of the vehicle 101.

Next, in a block 840, the computer 105 cleans the second cameras 130. The computer 105 sends instructions to the pump 225 to pump washer fluid via the fluid lines 230 to the nozzles 235. As described above, the nozzles 235 are arranged such that the washer fluid is distributed over the lens or covers of the second cameras 130.

Next, in a block 845, the computer 105 activates the second cameras 130. That is, the computer 105 sends instructions to the second cameras 130 to begin to capture second data 135 and provide the second data 135 to the computer 105. As described above, the second data 135 is image data collected by the second cameras 130 that the computer 105 requests to determine a type of an object 160 detected by a radar 110. The second data 135 includes image data from areas proximate to the vehicle 101 that are not included in the field of vision of the first sensors 120. The computer 105 receives the second data 135 from the second cameras 130.

Next, in a block 850, the computer 105 sends the second data 135 to the server 145. The computer 105 may additionally send first data 125 to the server 145. The vehicle 101 remains stopped. The process 800 continues in a block 850.

In the block 855, the server 145 determines whether it can determine the type of the object 160 based on the second data 135, and, when applicable, first data 125. In the case that the server 145 can determine the type of the object 160, the process 800 continues in the block 860. In the case that the server 145 cannot determine the type of the object 160, the process 800 continues in a block 865.

In the block 860, the computer 105 receives a message from the server 145 indicating the object type. The computer 105 resumes autonomous control of the vehicle 101 based on the object. The process 800 continues in the block 830.

In a block 865, which follows the block 855, the computer 105 receives a message from the server 145 indicating that the server 145 was not able to determine the object type. The computer 105 maintains the vehicle 101 in a stopped condition.

Next, in a block 870, one of the server 145 and the computer 105 takes steps to remediate the stopped condition of the vehicle 101. For example, the server 145 or computer 105 may send a message to a technician, reporting that the vehicle 101 is stopped, and requesting intervention. The process 800 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

The computer 105 and the server 145 generally include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 and the server 145 is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 800, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A computer in a vehicle comprising a processor and a memory, the memory storing instructions executable by the processor such that the processor is programmed to:
   detect an object proximate to the vehicle based on first data from first sensors;
   determine that a type of the object is indeterminate based on the first data from the first sensors;
   activate at least one of a plurality of cameras from a deactivated state based on the determination that the type of the object is indeterminate based on the first data from the first sensors, wherein the at least one of the plurality of cameras was in the deactivated state at a time of detecting the object;
   determine the type of the object based on second data from the at least one of the plurality of cameras; and
   operate the vehicle according to the type of the object determined with the second data from the at least one of the plurality of cameras.

2. The computer of claim 1, wherein the processor is further programmed to:
   stop the vehicle based on the determination that the type of the object is indeterminate based on the first data from the first sensors.

3. The computer of claim 2, wherein the processor is further programmed to:

request a server to determine the type of the object based on the camera data;

receive a message from the server indicating that the server determined that the type of the object is indeterminate based on the first data; and maintain the vehicle in a stopped condition based on the determination by the server that the type of the object is indeterminate.

4. The computer of claim 1, wherein the first sensors have a first field of vision and the plurality of cameras have a second field of vision that includes an area between the first field of vision and the vehicle.

5. The computer of claim 1, wherein the plurality of cameras are located below a roofline of the vehicle.

6. The computer of claim 1, wherein one of the plurality of cameras is located at one of a side-view mirror of the vehicle, a front grill area of the vehicle, and a rear license plate area of the vehicle.

7. The computer of claim 1, wherein the processor is further programmed to:

request a server to determine the type of the object based on the data from the at least one of the plurality of cameras; and receive the type of the object from the server.

8. The computer of claim 1, wherein the processor is further programmed to:

clean one or more of the plurality of cameras.

9. The computer of claim 1, wherein detecting the object proximate to the vehicle includes programming to determine that the object is within a predetermined distance of a path of the vehicle.

10. A system comprising:

first sensors mountable to a vehicle;

a plurality of cameras mountable to the vehicle; and a computer comprising a processor and a memory, the memory storing instructions executable by the processor such that the processor is programmed to:

detect an object proximate to the vehicle based on first data from the first sensors;

determine that a type of the object is indeterminate based on the first data from the first sensors;

activate at least one of the plurality of cameras from a deactivated state based on the determination that the type of the object is indeterminate based on the first data from the first sensors, wherein the at least one of the plurality of cameras was in the deactivated state at a time of detecting the object;

determine the type of the object based on second data from the at least one of the plurality of cameras; and operate the vehicle according to the type of the object determined with the second data from the at least one of the plurality of cameras.

11. The system of claim 10, wherein the processor is further programmed to:

stop the vehicle based on the determination that the the type of the object is indeterminate based on the first data from the first sensors.

12. The system of claim 10, further comprising:

a server programmed to:

receive a request from the processor to determine the type of the object type based on the second data from the at least one of the plurality of cameras;

determine the type of the object; and send the type of the object to the processor.

13. The system of claim 10, wherein the first sensors have a first field of vision and the plurality of cameras have a second field of vision that includes an area between the first field of vision and the vehicle.

14. The system of claim 10, wherein one of the plurality of cameras is located at one of a side-view mirror of the vehicle, a front grill area of the vehicle, and a rear license plate area of the vehicle.

15. The system of claim 10, further comprising:

cleaning means, wherein the processor is further programmed to:

activate the cleaning means to clean at least one of the cameras.

16. A system comprising:

first sensors;

image capturing means;

processing means; wherein the processing means is programmed to:

detect an object proximate to a vehicle based on first data from the first sensors;

determine that a type of the object is indeterminate based on the first data from the first sensors;

activate the image capturing means from a deactivated state based on the determination that the type of the object is indeterminate based on the first data from the first sensors wherein the image capturing means was in the deactivated state at a time of detecting the object;

determine the type of the object based on second data from the image capturing means; and operate the vehicle according to the type of the object determined with second data from the image capturing means.

17. The system of claim 16, wherein the processing means is further programmed to:

stop the vehicle based on the determination that the type of the object is indeterminate based on the first data from the first sensors; and activate cleaning means to clean the image capturing means.

18. The system of claim 17, wherein the processing means is further programmed to:

request a server to determine the type of the object based on the second data from the image capturing means;

receive a message from the server indicating that the type of the object is indeterminate for the server; and maintain the vehicle in a stopped condition, based on the determination that the type of the object is indeterminate for the server.

* * * * *

UNITED STATES PATENT AND TRADEMARK OFFICE
CERTIFICATE OF CORRECTION

PATENT NO. : 10,752,218 B2
APPLICATION NO. : 15/902617
DATED : August 25, 2020
INVENTOR(S) : Taneshia Turner Page 1 of 1

It is certified that error appears in the above-identified patent and that said Letters Patent is hereby corrected as shown below:

In the Claims

Column 11, Line 56, in Claim 11, replace "determination that the the" with — determination that the —.

Column 12, Line 31, in Claim 16, replace "the first sensors wherein the image" with — the first sensors, wherein the image —.

Signed and Sealed this
Fifteenth Day of December, 2020

Andrei Iancu
*Director of the United States Patent and Trademark Office*